(12) United States Patent
Huang et al.

(10) Patent No.: US 8,079,740 B2
(45) Date of Patent: Dec. 20, 2011

(54) LAMP POSITION ADJUSTMENT DEVICE AND LAMP MODULE HAVING THE SAME

(75) Inventors: Wei-Hao Huang, Hsin-Chu (TW); Chih-Chung Yang, Hsin-Chu (TW); Chien-Chi Shen, Hsin-Chu (TW)

(73) Assignee: Coretronic Corporation, Hsinchu (TW)

( * ) Notice: Subject to any disclaimer, the term of this patent is extended or adjusted under 35 U.S.C. 154(b) by 429 days.

(21) Appl. No.: 12/369,404

(22) Filed: Feb. 11, 2009

(65) Prior Publication Data
US 2009/0237947 A1 Sep. 24, 2009

(30) Foreign Application Priority Data
Mar. 21, 2008 (TW) ................................ 97109986 A

(51) Int. Cl.
*F21S 8/08* (2006.01)
(52) U.S. Cl. ........................................ 362/419; 362/269
(58) Field of Classification Search .................. 362/269, 362/285, 287, 418, 419, 426, 427
See application file for complete search history.

(56) References Cited

U.S. PATENT DOCUMENTS

| | | | | |
|---|---|---|---|---|
| 5,176,443 A | * | 1/1993 | Lin | 362/413 |
| 6,079,852 A | * | 6/2000 | Kamaya et al. | 362/287 |
| 2008/0123354 A1 | * | 5/2008 | Caldani | 362/418 |

FOREIGN PATENT DOCUMENTS

| | | |
|---|---|---|
| TW | 547674 | 8/2003 |
| TW | M275434 | 9/2005 |
| TW | 200702886 | 1/2007 |

* cited by examiner

*Primary Examiner* — David V Bruce
(74) *Attorney, Agent, or Firm* — Muncy, Geissler, Olds & Lowe, PLLC

(57) ABSTRACT

A lamp position adjustment device includes a bottom frame, a lamp holder, and a lamp mount. The lamp holder is disposed on the bottom frame for supporting the lamp, and the lamp mount is disposed between the lamp holder and the bottom frame. The lamp mount includes a base portion, a first side portion and a second side portion that are respectively connected to two opposite sides of the base portion, a first positioning mechanism, and a second positioning mechanism. The first positioning mechanism is disposed on the base portion to enable the lamp mount to be slidably connected to the bottom frame, and the second positioning mechanism is disposed on the first side portion and the second side portion to enable the lamp mount to be slidably connected to the lamp holder.

20 Claims, 7 Drawing Sheets

42

LAMP POSITION ADJUSTMENT DEVICE AND LAMP MODULE HAVING THE SAME

CROSS REFERENCE TO RELATED APPLICATION

This application claims priority of application No. 097109986 filed in Taiwan R.O.C on Mar. 21, 2008 under 35 U.S.C. §119; the entire contents of which are hereby incorporated by reference.

BACKGROUND OF THE INVENTION

1. Field of the Invention

The present invention relates to a lamp position adjustment device and a lamp module having the lamp position adjustment device.

2. Description of the Related Art

FIG. 1 shows a schematic diagram illustrating a conventional lamp module 100 used in a projector. The lamp module 100 includes a lamp 102 and a lamp holder 104 attached to a front end of the lamp 102, where the lamp 102 screws on the lamp holder 104 through screws 106. Typically, the brightest point of a lamp lies in the tip of a lamp wick. Hence, optimum brightness for a projected image is obtained when the position of the lamp 12 in space is optimized. However, manufacturing tolerances always exist in the fabrication of each lamp. As shown in FIG. 1, once the lamp module 100 is installed on a projector (not shown) and fails to provide optimum brightness as result of inferior positioning, the lamp module 100 needs to be re-installed to cure such deficiency, and the re-installation is inconvenient and time-consuming. Further, in the conventional design, since one cannot independently adjust the lamp position in a select direction, it fails to achieve an accurate position adjustment to correct manufacturing errors in each lamp. This results in inferior output brightness of a projector.

BRIEF SUMMARY OF THE INVENTION

The present invention relates to a lamp position adjustment device and a lamp module having a simplified configuration and a reduced fabrication cost.

According to an embodiment of the invention, a lamp position adjustment device includes a bottom frame, a lamp holder, and a lamp mount. The lamp holder is disposed on the bottom frame for supporting a lamp that is attached to the lamp holder, and the lamp mount is disposed between the lamp holder and the bottom frame. The lamp mount has a base portion, a first side portion and a second side portion that are respectively connected to two opposite sides of the base portion, a first positioning mechanism, and a second positioning mechanism. The first positioning mechanism is disposed on the base portion to enable the lamp mount to be slidably connected to the bottom frame, where the lamp mount slides in relation to the bottom frame to allow a first movement. The second positioning mechanism is disposed on the first side portion and the second side portion to enable the lamp mount to be slidably connected to the lamp holder, where the lamp holder slides in relation to the lamp mount to allow a second movement.

According to another embodiment of the invention, a lamp module includes a lamp, a lamp holder for supporting the lamp, a bottom frame for bearing the lamp holder and the lamp, a lamp mount disposed between the lamp holder and the bottom frame, at least one first connecting member connected between the lamp mount and the bottom frame, and at least one second connecting member connected between the lamp mount and the lamp holder. The lamp mount has a base portion, a first side portion and a second side portion that are respectively connected to two opposite sides of the base portion, a first positioning mechanism, and a second positioning mechanism. The first positioning mechanism is disposed on the base portion to enable the lamp mount to be slidably connected to the bottom frame, where the lamp mount slides in relation to the bottom frame to allow a first movement. The second positioning mechanism is disposed on the first side portion and the second side portion to enable the lamp mount to be slidably connected to the lamp holder, where the lamp holder slides in relation to the lamp mount to allow a second movement.

According to the above embodiments, the use of the bottom frame, the lamp holder, and the lamp mount together permits upright and lateral position adjustment for the lamp in space. This effectively reduces the number of constituting members and fabrication cost of a position-adjustable lamp module. Besides, since a position adjusting mechanism and a fastening mechanism are integrated on a same face of a lamp module, the position adjusting and assembling processes are considerably simplified.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
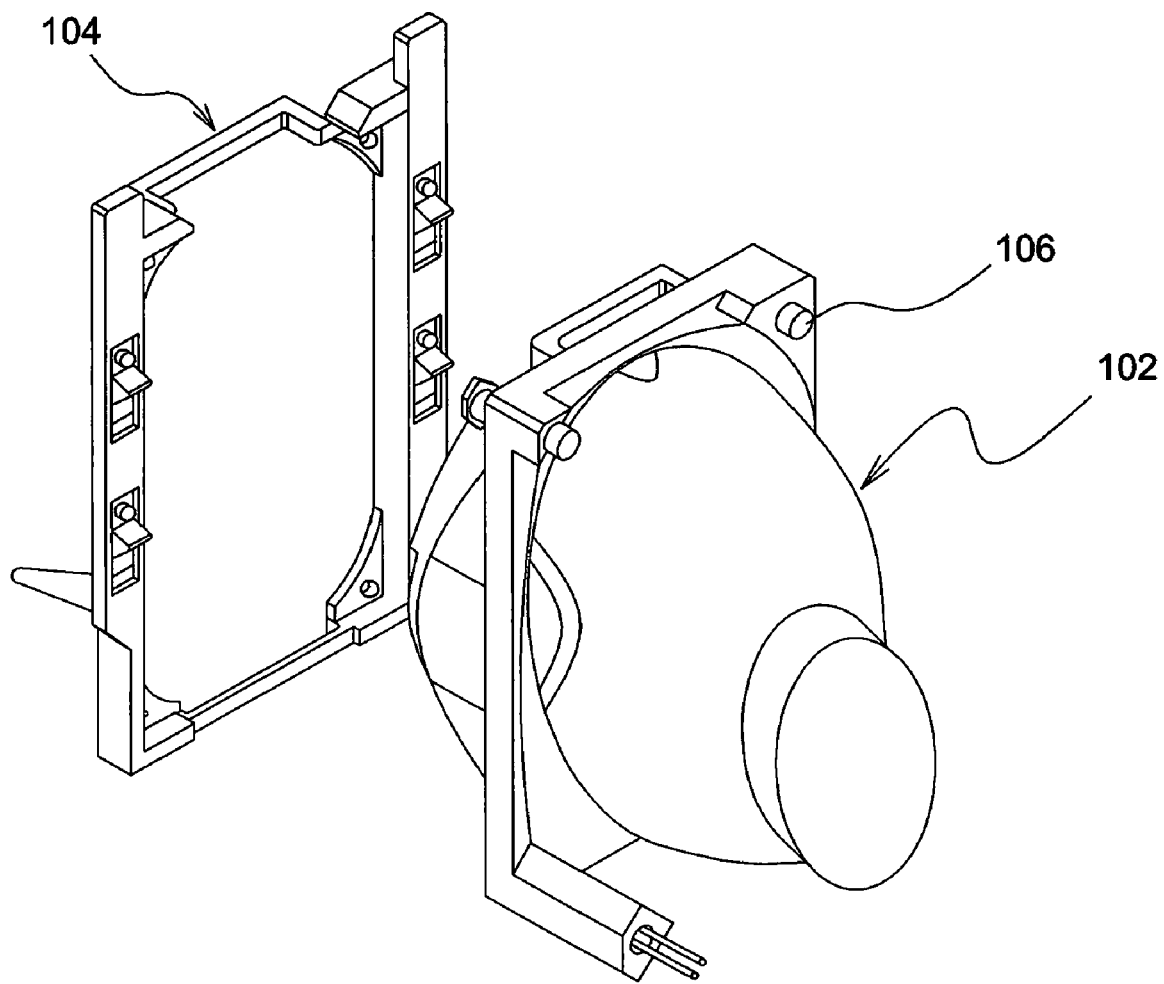
FIG. 1 shows a schematic diagram illustrating a conventional lamp module used in a projector.
Figure 2:
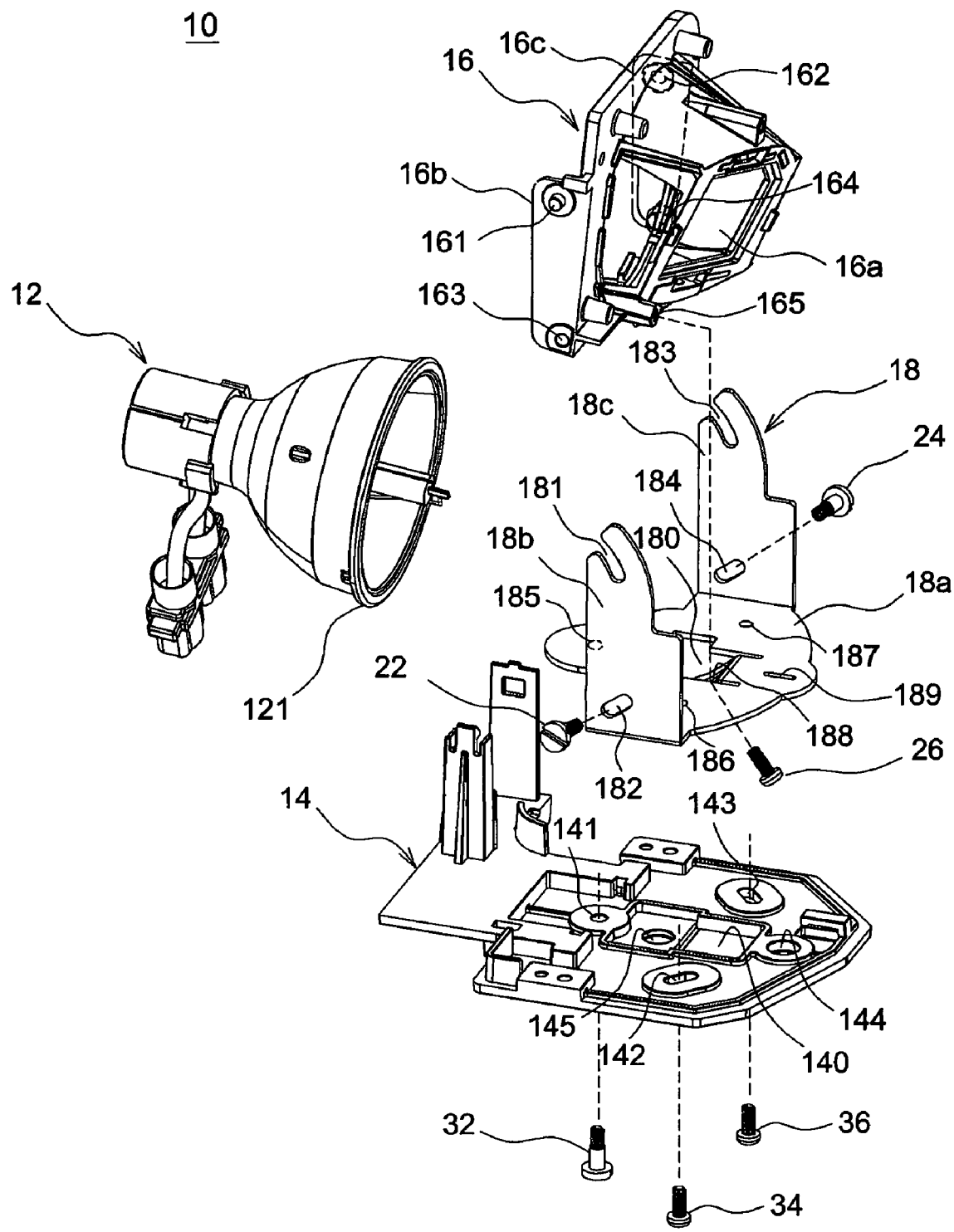
FIG. 2 shows an explosion diagram illustrating a lamp module having a lamp position adjustment device according to an embodiment of the invention.

FIG. 2 shows an explosion diagram illustrating a lamp module 10 having a lamp position adjustment device according to an embodiment of the invention. Referring to FIG. 2, a lamp module 10 includes a lamp 12, a bottom frame 14, a lamp holder 16, and a lamp mount 18. The bottom frame 14 bears the lamp holder 16 and the lamp 12, the lamp holder 16 is disposed the bottom frame 14, supports the lamp 12, and covers at least part of a light-transmitting side wall 121 of the lamp 12, and the lamp mount 18 is disposed between the bottom frame 14 and the lamp holder 16.

Figure 3:
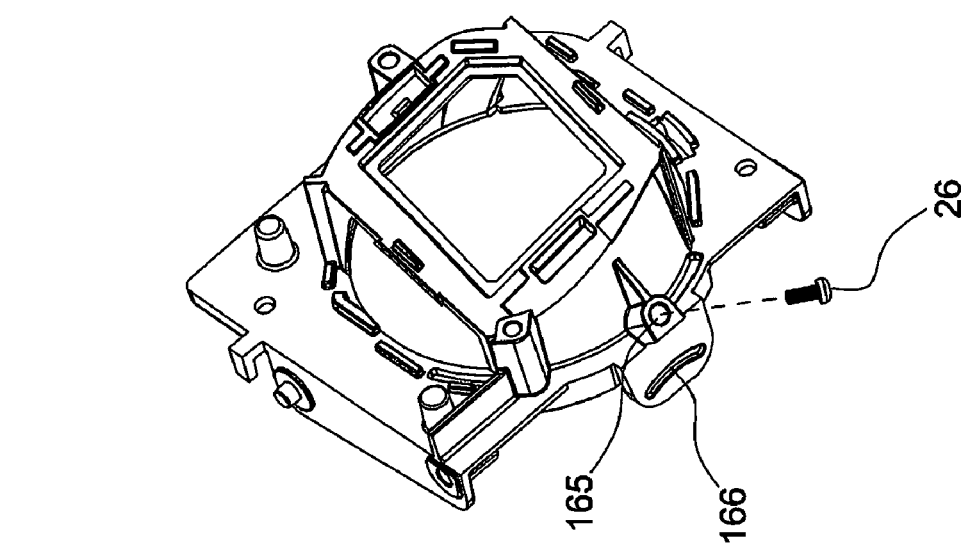
FIG. 3 shows a schematic diagram illustrating a lamp holder according to an embodiment of the invention.

The bottom frame 14 has a first opening 140, a first shaft hole 141, a first laterally fastening hole 142, a second laterally fastening hole 143, a laterally adjusting hole 144, an upright adjusting hole 145. The lamp holder 16 has a light-emitting opening 16a, and a first sidewall 16b and a second sidewall 16c are provided on two opposite sides of the light-emitting opening 16a, respectively. A first guide pillar 161 and a first bolt hole 163 are formed on the first sidewall 16b, and a second guide pillar 162 and a second bolt hole 164 are formed on the second sidewall 16c. Further, referring to FIG. 3 where the lamp holder 16 is observed in another direction, in this embodiment, a first upright fastening hole 165 and a guide slot 166 are formed on a bottom of the lamp holder 16.

Figure 4:
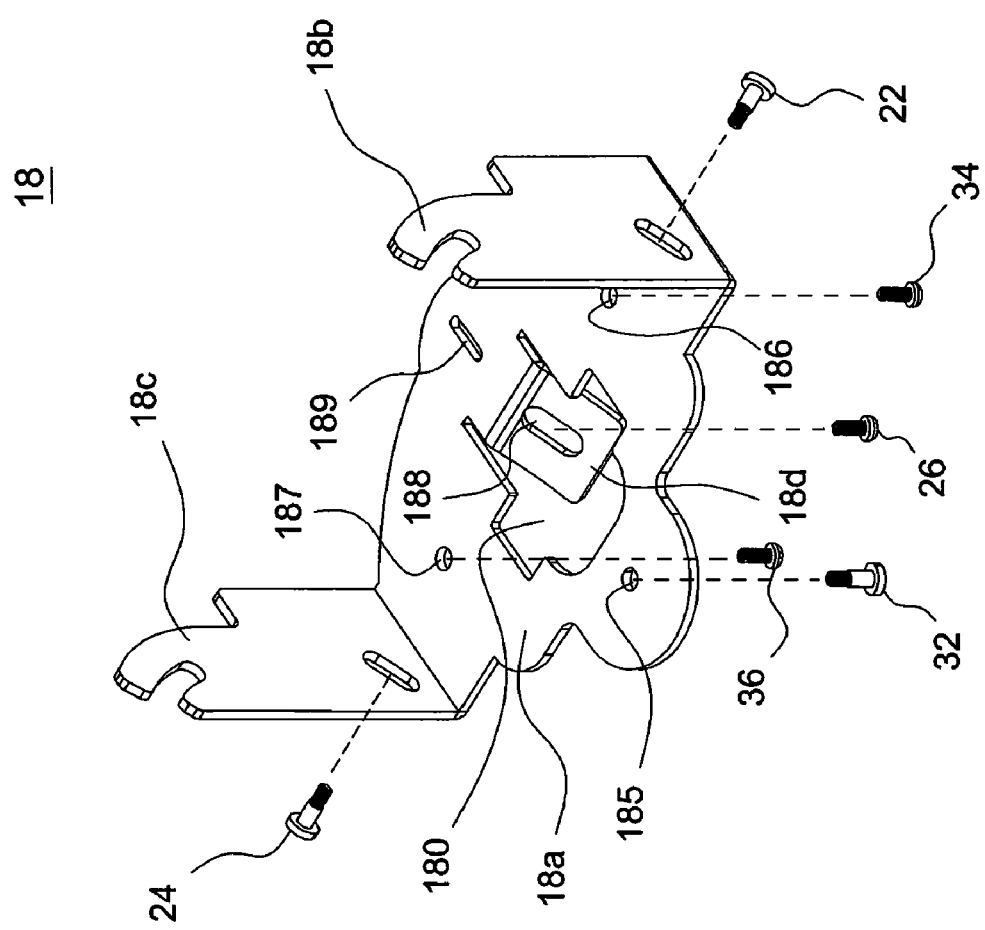
FIG. 4 shows a schematic diagram illustrating a lamp mount according to an embodiment of the invention.

The lamp mount 18 has a base portion 18a and a first side portion 18b and a second side portion 18c that are respectively connected to two opposite sides of the base portion 18a and are perpendicular to the base portion 18a. A first slide rail 181 is formed on a top side of the first side portion 18b, and a second slide rail 182 is formed on its bottom side. A third slide rail 183 is formed on a top side of the second side portion 18c, and a fourth slide rail 184 is formed on its bottom side. In one embodiment, the first slide rail 181 and the third slide rail 183 each have a substantial same first height relative to the base portion 18a, and the second slide rail 182 and the fourth slide rail 184 each have a substantial same second height relative to the base portion 18a, and the first height is larger than the second height. Besides, referring to FIG. 4 where the lamp mount 18 is observed in another direction, in this embodiment, the base portion 18a of the lamp mount 18 has a second opening 180 and a flange 18d. The flange 18d has a second upright fastening hole 188 and makes an acute angle with the base portion 18a. The base portion 18a has a second shaft hole 185, a third laterally fastening hole 186, a fourth laterally fastening hole 187 and a guide slot 189, and the second shaft hole 185 is opposite the guide slot 189.

According to this embodiment, during assembly the base portion 18a of the lamp mount 18 is positioned substantially parallel to the horizontal in space, and the first side portion 18b and the second side portion 18c of the lamp mount 18 are positioned substantially perpendicular to the horizontal in space. The first guide pillar 161 and the second guide pillar 162 of the lamp holder 16 are inserted into the corresponding first slide rail 181 and third slide rail 183, respectively. A rail screw 22 passes the second slide rail 182 and is inserted into the first bolt hole 163 of the lamp holder 16, and a rail screw 24 passes through the fourth slide rail 184 and is inserted into the second bolt hole 164, so the lamp holder 16 is slidably connected to the lamp mount 18, and the slide rails 181-184 enable the lamp holder 16 to slide upright in relation to the lamp mount 18 to a limited extent. Such configuration permits an upright position adjustment of the lamp 12 achieved by the following steps. Further, a shaft screw 32 passes the first shaft hole 141 of the bottom frame 14 and is inserted into the second shaft hole 185 of the lamp mount 18, so the bottom frame 14 is slidably connected to the lamp mount 18 to allow the lamp mount 18 to slide laterally in relation to the bottom frame 14 to a limited extent, with the shaft screw 32 serving as a pivot. Such configuration permits a lateral position adjustment of the lamp 12 achieved by the following steps.

Figure 5:
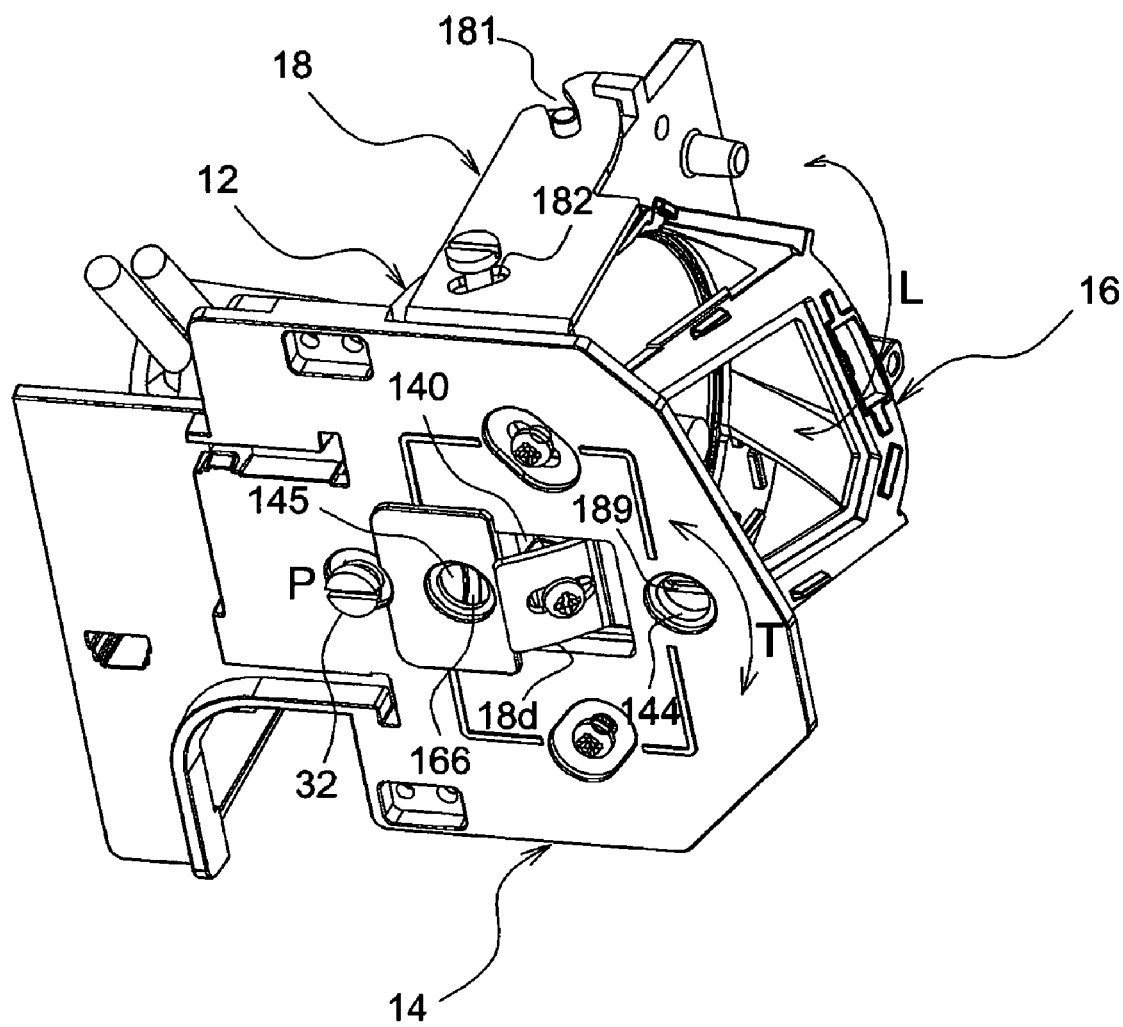
FIG. 5 shows a schematic diagram illustrating an assembly of the lamp module shown in FIG. 2.

The position adjustment steps and fastening steps after adjustment for the lamp module 10 according to an embodiment are described below with reference to FIG. 5. Referring to FIG. 5, after the bottom frame 14, the lamp holder 16 and the lamp mount 18 are assembled together, the laterally adjusting hole 144 of the bottom frame 14 overlaps the guide slot 189 of the lamp mount 18, and the upright adjusting hole 145 of the bottom frame 14 overlaps the guide slot 166 of the lamp holder 16. The flange 18d of the lamp mount 18 is inserted into the first opening 140 of the bottom frame 14. Further, an area of the laterally adjusting hole 144 is larger than that of the guide slot 189, and an area of the upright adjusting hole 145 is larger than that of the guide slot 166. Hence, for example, a lateral position of the lamp mount 18 in relation to the bottom frame 14 is varied within the limited extent by means of a position adjusting tool 42 shown in FIG. 6. The position adjusting tool 42 has a planar front end on which a biased protrusion 44 is provided. When the front end of the position adjusting tool 42 is inserted into the laterally adjusting hole 144 and rotates clockwise or counterclockwise, the biased protrusion 44 inserted into the guide slot 189 forces the lamp amount 18 to rotate about a pivot P (a securing position of the shaft screw 32 that overlaps the position of a lamp wick of the lamp 12) in a lateral direction T. Similarly, when the front end of the position adjusting tool 42 is inserted into the upright adjusting hole 145 and rotates clockwise or counterclockwise, the biased protrusion 44 inserted into the guide slot 166 forces the lamp holder 16 to move. In that case, since the profiles of two slide rails in the same side portion (such as the first slide rail 181 and the second slide rail 182) may extend to form a substantial arc line, the lamp holder 16 is allowed to rotate back and forth in an upright direction L. Through above position adjustment steps, the lamp 12 is placed in an optimum position to provide excellent illumination when the lamp module 10 is installed in an application environment such as a projector. Referring back to FIG. 2, a screw 26 is inserted into the first upright fastening hole 165 and the second upright fastening hole 188 and tightened to complete the upright position adjustment. Besides, a screw 34 is inserted into a first laterally fastening hole 142 and a third laterally fastening hole 186, a screw 36 is inserted into a second laterally fastening hole 143 and a fourth laterally fastening hole 187, and the screw 34 and the screw 36 are tightened to complete the lateral position adjustment.

Figure 6:
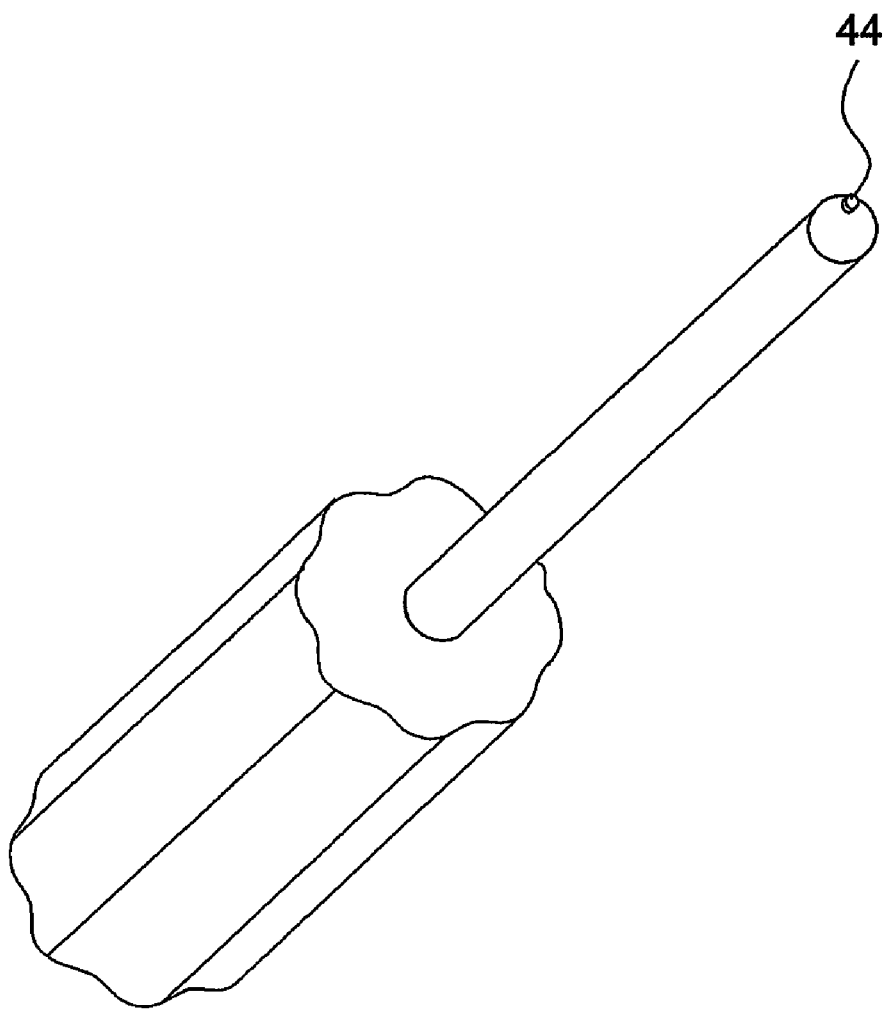
FIG. 6 shows a schematic diagram illustrating a position adjusting tool according to an embodiment of the invention.

Hence, according to this embodiment, the use of the bottom frame 14, the lamp holder 16 and the lamp mount 18 together permits upright and lateral position adjustment for the lamp 12 in space. This effectively reduces the number of constituting members and fabrication cost of a position-adjustable lamp module. Besides, since a position adjusting mechanism and a fastening mechanism are integrated on a same face of the lamp module 10, the position adjusting and assembling processes are considerably simplified. Note that the position adjusting tool 42 is not limited to a specific type as shown in FIG. 6, and it may be in other type as long as a fine position adjustment is achieved after the bottom frame 14, the lamp holder 16 and the lamp mount 18 are slidably joined.

Figure 7:
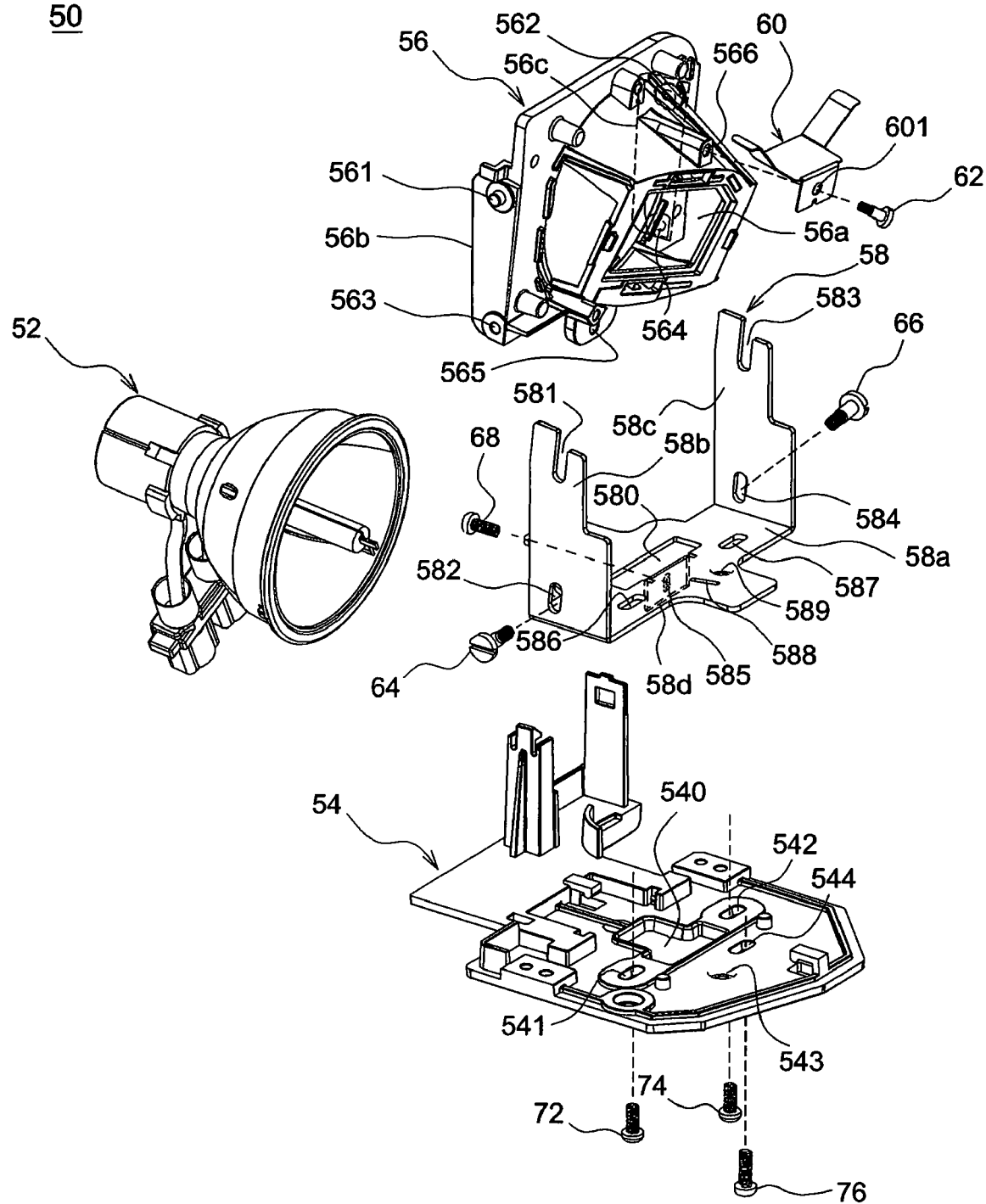
FIG. 7 shows an explosion diagram illustrating a lamp module having a lamp position adjustment device according to another embodiment of the invention.

FIG. 7 shows an explosion diagram of a lamp module 50 having a lamp position adjustment device according to another embodiment of the invention.

Referring to FIG. 7, the lamp module 50 includes a lamp 52, a bottom frame 54, a lamp holder 56, a lamp mount 58 and a resilient sheet 60. A first opening 540, a first laterally fastening hole 541, a second laterally fastening hole 542, a laterally adjusting hole 543 and a first upright adjusting hole 544 are formed on the bottom frame 54. The lamp holder 56 has a light-emitting opening 56a, and a first sidewall 56b and a second sidewall 56c are formed on two opposite sides of the light-emitting opening 56a, respectively. The first sidewall 56b has a first guide pillar 561 and a first bolt hole 563, and the second sidewall 56c has a second guide pillar 562 and a second bolt hole 564. Further, in this embodiment, a bottom of the lamp holder 56 has a first upright fastening hole 565, and a top of the lamp holder 56 is provided with a fastening hole 566 to fix the resilient sheet 60. The resilient sheet 60 has a fastening hole 601 corresponding to the position of the fastening hole 566 of the lamp holder 56.

The lamp mount 58 has a base portion 58a and a first side portion 58b and a second side portion 58c that are respectively connected to two opposite sides of the base portion 58a and are perpendicular to the base portion 58a. A first slide rail 581 is formed on a top side of the first side portion 58b, and a second slide rail 582 is formed on its bottom side. A third slide rail 583 is formed on a top side of the second side portion 58c, and a fourth slide rail 584 is formed on its bottom side. Besides, in this embodiment, the base portion 58a of the lamp mount 58 has a second opening 580 and a flange 58d. The flange 58d has a second upright fastening hole 585 and makes a right angle with the base portion 58a. The base portion 58a has a third laterally fastening hole 586, a fourth laterally fastening hole 587, a guide slot 588 and a second upright adjusting hole 589.

According to this embodiment, during assembly the base portion 58a of the lamp mount 58 is positioned substantially parallel to the horizontal in space, and the side portions 58b and 58c of the lamp mount 58 are positioned substantially perpendicular to the horizontal in space. A screw 62 is inserted into the fastening hole 601 of the resilient sheet 60 and the fastening hole 566 of the lamp holder 56 and tightened to fix the resilient sheet 60 on a top side of the lamp holder 56. The first guide pillar 561 and the second guide pillar 562 of the lamp holder 56 are inserted into the corresponding first slide rail 581 and third slide rail 583, respectively. A rail screw 64 passes through the second slide rail 582 and is inserted into the first bolt hole 563 of the lamp holder 56, and a rail screw 66 passes through a fourth slide rail 584 and is inserted into the second bolt hole 564, so the lamp holder 56 is slidably connected to the lamp mount 58, and the slide rails 581-584 enable the lamp holder 56 to slide upright in relation to the lamp mount 58 to a limited extent. Such configuration permits an upright position adjustment of the lamp 52 achieved by the following steps. Further, a screw 72 is inserted into a first laterally fastening hole 541 and a third laterally fastening hole 543, and a screw 74 is inserted into a second laterally fastening hole 542 and a fourth laterally fastening hole 587. Hence, when the screws 72 and 74 are not tightened, the bottom frame 54 is slidably connected to the lamp mount 58 to allow the lamp mount 58 to slide laterally in relation to the bottom frame 54 to a limited extent. Such configuration permits a lateral position adjustment of the lamp 52 achieved by the following steps.

Figure 8:
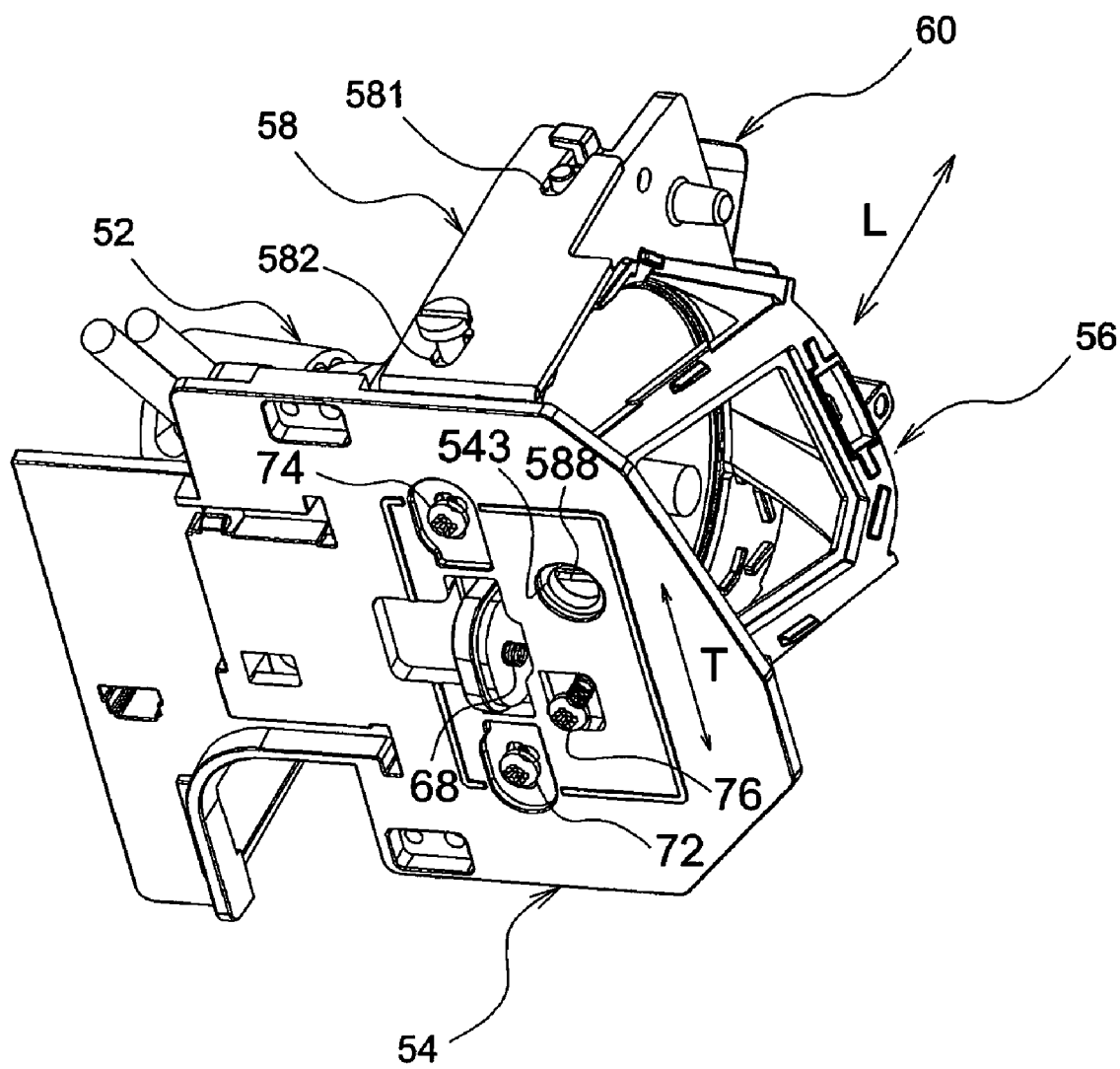
FIG. 8 shows a schematic diagram illustrating an assembly of the lamp module shown in FIG. 7.

The position adjustment steps and fastening steps after adjustment for the lamp module 50 according to another embodiment are described below with reference to FIG. 8. Referring to FIG. 8, after the bottom frame 54, the lamp holder 56, the lamp mount 58 and the resilient sheet 60 are assembled together, the laterally adjusting hole 543 of the bottom frame 54 overlaps the guide slot 588 of the lamp mount 58. Hence, the lateral position of the lamp mount 58 in relation to the bottom frame 54 may be varied similarly by means of a position adjusting tool 42 shown in FIG. 6. When a front end of the position adjusting tool 42 is inserted into the laterally adjusting hole 543 and rotates clockwise or counterclockwise, the biased protrusion 44 inserted into the guide slot 588 forces the lamp amount 58 in relation to the bottom frame 54 to linearly slide in a lateral direction T. When the laterally position adjustment is completed, the screws 72 and 74 are used to tighten and fix the position. Further, according to this embodiment, the upright position adjustment is achieved by resilient force of the resilient sheet 60 and the insertion of an upright adjusting screw 76. When the resilient sheet 60 is attached to the lamp holder 56, its resilient force enables the lamp holder 56 to press against the bottom frame 54. In that case, when the upright adjusting screw 76 that passes though the upright position adjusting holes 544 and 589 is inwardly tightened, the upright adjusting screw 76 presses against the lamp holder 56 and force it to move upwards. In comparison, when the upright adjusting screw 76 is outwardly loosed, the lamp holder 56 returns to press against and move towards the bottom frame 54. Besides, since the profiles of two slide rails in the same side portion (such as the first slide rail 581 and the second slide rail 582) may be extended to form a substantial straight line, the lamp holder 56 is allowed to move back and forth in a straight line in an upright direction L. Finally, a screw 68 is inserted into the first upright fastening hole 565 and the second upright fastening hole 585 and tightened to complete the upright position adjustment. Through above position adjusting steps, the lamp 52 may be placed in an optimum position to provide excellent illumination.

Note that, in the above embodiments with reference to FIG. 5 and FIG. 8, a first positioning mechanism for adjusting lateral position and a second positioning mechanism for adjusting upright position are independent of each other. For example, in the lamp module 10 shown in FIG. 5, the arc-line-shaped guide rails 181-184 may be replaced with the straight-line-shaped guide rails 581-584, and the guide slot 166 may be replaced with the upright adjusting screw 76 to achieve similar position adjusting effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lamp position adjustment device, comprising:
    a bottom frame;
    a lamp holder disposed on the bottom frame for supporting a lamp that is attached to the lamp holder; and
    a lamp mount disposed between the lamp holder and the bottom frame, the lamp mount comprising:
        a base portion;
        a first side portion and a second-side portion respectively connected to two sides of the base portion;
        a first positioning mechanism disposed on the base portion to enable the lamp mount to be slidably connected to the bottom frame, wherein the lamp mount slides in relation to the bottom frame to allow a first movement; and
            a second positioning mechanism disposed on the first side portion and the second side portion to enable the lamp mount to be slidably connected to the lamp holder, wherein the lamp holder slides in relation to the lamp mount to allow a second movement, the first movement is performed by the lamp mount that moves in a direction parallel to the base portion, and the second movement is performed by the lamp holder that moves in a direction parallel to the first side portion of the lamp mount or the second side portion of the lamp mount.

2. The lamp position adjustment device as claimed in claim 1, wherein the first side portion and the second side portion are each substantially perpendicular to the base portion.

3. The lamp position adjustment device as claimed in claim 1, wherein the lamp mount further has a first opening and a flange that are formed on the base portion, and the flange has a fastening hole and makes an angle with the base portion.

4. The lamp position adjustment device as claimed in claim 1, wherein the first positioning mechanism comprises a plurality of first fastening holes formed on the base portion, and the bottom frame has a plurality of second fastening holes corresponding to the positions of the first fastening holes.

5. The lamp position adjustment device as claimed in claim 4, wherein the lamp mount pivots on one of the first fastening holes to perform the first movement.

6. The lamp position adjustment device as claimed in claim 4, wherein the base portion of the lamp mount is provided with a guide slot, and the bottom frame is provided with an adjusting hole corresponding to the position of the guide slot to vary a position of the lamp mount in relation to the bottom frame through the first movement.

7. The lamp position adjustment device as claimed in claim 6, wherein the lamp mount pivots on one of the first fastening holes to perform the first movement, and the first fastening hole that serves as the pivot is opposite the guide slot.

8. The lamp position adjustment device as claimed in claim 1, wherein the second positioning mechanism comprises:
    a first slide rail and a second slide rail both formed on the first side portion; and
    a third slide rail and a fourth slide rail both formed on the second side portion;
    wherein the first slide rail and the third slide rail each have a substantial same first height relative to the base portion, the second slide rail and the fourth slide rail each have a substantial same second height relative to the base portion, and the first height is larger than the second height.

9. The lamp position adjustment device as claimed in claim 8, wherein the lamp holder is provided with a first guide pillar and a second guide pillar corresponding to the first slide rail and the third slide rail, respectively, and the lamp holder is provided with a first bolt hole and a second bolt hole corresponding to the second slide rail and the fourth slide rail, respectively.

10. The lamp position adjustment device as claimed in claim 8, wherein the profiles of the first slide rail and the second rail are extended to form a first line, the profiles of the third slide rail and the fourth slide rail are extended to form a second line, and the first line and the second line are both arc lines.

11. The lamp position adjustment device as claimed in claim 10, wherein the lamp holder is provided with a guide slot, and the bottom frame is provided with an adjusting hole corresponding to the guide slot to vary a position of the lamp holder in relation to the lamp mount through the second movement.

12. The lamp position adjustment device as claimed in claim 10, wherein the lamp mount further has a second opening and a flange that are formed on the base portion, the flange has a first fastening hole and makes an acute angle with the base portion, and the lamp holder has a second fastening hole corresponding to the position of the first fastening hole.

13. The lamp position adjustment device as claimed in claim 8, wherein the profiles of the first slide rail and the second rail are extended to form a first line, the profiles of the third slide rail and the fourth slide rail are extended to form a second line, and the first line and the second line are both straight lines.

14. The lamp position adjustment device as claimed in claim 13, wherein the lamp mount further has a second opening and a flange that are formed on the base portion, the flange has a first fastening hole and makes a right angle with the base portion, and the lamp holder has a second fastening hole corresponding to the position of the first fastening hole.

15. The lamp position adjustment device as claimed in claim 13, wherein the bottom frame is provided with a first adjusting hole, and the base portion of the lamp mount is provided with a second adjusting hole corresponding to the position of the first adjusting hole.

16. The lamp position adjustment device as claimed in claim 15, further comprising:
   a resilient sheet attached to a top side of the lamp holder; and
   an adjusting screw inserted into the first adjusting hole and the second adjusting hole and pressing against the lamp holder to vary a position of the lamp holder in relation to the lamp mount through the second movement.

17. A lamp module, comprising:
   a lamp;
   a lamp holder supporting the lamp;
   a bottom frame bearing the lamp holder and the lamp;
   a lamp mount disposed between the lamp holder and the bottom frame, the lamp mount comprising:
      a base portion;
      a first side portion and a second side portion respectively connected to two sides of the base portion;
         a first positioning mechanism disposed on the base portion to enable the lamp mount to be slidably connected to the bottom frame, wherein the lamp mount slides in relation to the bottom frame to allow a first movement; and
         a second positioning mechanism disposed on the first side portion and the second side portion to enable the lamp mount to be slidably connected to the lamp holder, wherein the lamp holder slides in relation to the lamp mount to allow a second movement, the first movement is performed by the lamp mount that moves in a direction parallel to the base portion, and the second movement is performed by the lamp holder that moves in a direction parallel to the first side portion of the lamp mount or the second side portion of the lamp mount;
   at least one first connecting member connected between the lamp mount and the bottom frame; and
   at least one second connecting member connected between the lamp mount and the lamp holder.

18. The lamp module as claimed in claim 17, wherein the first connecting member and the second connecting member each comprise a screw.

19. The lamp module as claimed in claim 17, wherein the first positioning mechanism comprises a plurality of first fastening holes formed on the base portion, and the bottom frame has a plurality of second fastening holes corresponding to the positions of the first fastening holes.

20. The lamp module as claimed in claim 17, wherein the second positioning mechanism comprises:
   a first slide rail and a second slide rail both formed on the first side portion; and
   a third slide rail and a fourth slide rail both formed on the second side portion;
      wherein the first slide rail and the third slide rail each have a substantial same first height relative to the base portion, the second slide rail and the fourth slide rail each have a substantial same second height relative to the base portion, and the first height is larger than the second height.

* * * * *